US009625775B2

(12) United States Patent
Katagiri et al.

(10) Patent No.: US 9,625,775 B2
(45) Date of Patent: Apr. 18, 2017

(54) DISPLAY DEVICE

(71) Applicant: Panasonic Liquid Crystal Display Co., Ltd., Hyogo (JP)

(72) Inventors: Yusuke Katagiri, Osaka (JP); Masaki Tsubokura, Osaka (JP)

(73) Assignee: Panasonic Liquid Crystal Display Co., Ltd, Hyogo (JP)

(*) Notice: Subject to any disclaimer, the term of this patent is extended or adjusted under 35 U.S.C. 154(b) by 11 days.

(21) Appl. No.: 14/436,789

(22) PCT Filed: Nov. 18, 2013

(86) PCT No.: PCT/JP2013/006762
§ 371 (c)(1),
(2) Date: Apr. 17, 2015

(87) PCT Pub. No.: WO2014/147684
PCT Pub. Date: Sep. 25, 2014

(65) Prior Publication Data
US 2016/0178952 A1    Jun. 23, 2016

(30) Foreign Application Priority Data
Mar. 22, 2013    (JP) .................................. 2013-060949

(51) Int. Cl.
G02F 1/1345    (2006.01)
G09G 3/36    (2006.01)
(Continued)

(52) U.S. Cl.
CPC ........ *G02F 1/13452* (2013.01); *G02F 1/1362* (2013.01); *G02F 1/1368* (2013.01);
(Continued)

(58) Field of Classification Search
None
See application file for complete search history.

(56) References Cited

U.S. PATENT DOCUMENTS 6,407,795 B1 * 6/2002 Kamizono .......... G02F 1/13452
349/149
6,583,844 B1    6/2003 Mishima et al.
(Continued)

FOREIGN PATENT DOCUMENTS

JP    H07-114036 A    5/1995
JP    H07-325315 A    12/1995
(Continued)

OTHER PUBLICATIONS

International Search Report issued in PCT/JP2013/006762, dated Feb. 4, 2014, with English translation.
(Continued)

*Primary Examiner* — Kimberly Rizkallah
*Assistant Examiner* — Bo Bin Jang
(74) *Attorney, Agent, or Firm* — McDermott Will & Emery LLP

(57) ABSTRACT

A display device includes: a TFT substrate including: a display region including a plurality of pixels; a plurality of source drivers arranged and aligned in a first direction along the display region; and a plurality of gate drivers arranged and aligned in a second direction along the display region; a printed board including a timing controller for controlling the plurality of source drivers and the plurality of gate drivers; and a plurality of flexible boards for connecting the TFT substrate and the printed board to each other, in which the plurality of flexible boards include a plurality of first flexible boards that extend obliquely to one side with respect to the second direction, and a plurality of second flexible boards that extend obliquely to another side with respect to the second direction.

16 Claims, 9 Drawing Sheets

(51) Int. Cl.
*G02F 1/1362* (2006.01)
*G02F 1/1333* (2006.01)
*G02F 1/1368* (2006.01)
*H01L 33/20* (2010.01)
*H01L 33/62* (2010.01)

(52) U.S. Cl.
CPC .. *G02F 1/133305* (2013.01); *G02F 1/136286* (2013.01); *G09G 3/3648* (2013.01); *G09G 2300/0426* (2013.01)

(56) References Cited

U.S. PATENT DOCUMENTS

| 2002/0008682 | A1* | 1/2002 | Park | G09G 3/20 345/87 |
|---|---|---|---|---|
| 2009/0051290 | A1* | 2/2009 | Song | H01J 11/12 313/582 |
| 2009/0153790 | A1 | 6/2009 | Tashiro | |

| 2009/0237588 | A1 | 9/2009 | Takenaka et al. |
|---|---|---|---|
| 2011/0235286 | A1 | 9/2011 | Kitayama et al. |
| 2012/0044176 | A1 | 2/2012 | Nakamura et al. |

FOREIGN PATENT DOCUMENTS

| JP | 2000-171818 A | 6/2000 |
|---|---|---|
| JP | 2000-187452 A | 7/2000 |
| JP | 2001-109391 A | 4/2001 |
| JP | 2002-175055 A | 6/2002 |
| JP | 2009-145439 A | 7/2009 |
| JP | 2009-229510 A | 10/2009 |
| JP | 2012-043201 A | 3/2012 |
| WO | 2011-070709 A1 | 6/2011 |

OTHER PUBLICATIONS

Japanese Office Action dated Dec. 20, 2016 issued in Japanese Patent Application No. 2013-060949.

* cited by examiner

DISPLAY DEVICE

RELATED APPLICATIONS

This application is the U.S. National Phase under 35 U.S.C. §371 of International Application No. PCT/JP2013/006762, filed on Nov. 18, 2013, which in turn claims the benefit of Japanese Application No. 2013-060949, filed on Mar. 22, 2013, the disclosures of which Applications are incorporated by reference herein.

TECHNICAL FIELD

The present invention relates to a display device.

BACKGROUND ART

A liquid crystal display module as disclosed in Patent Literature 1, for example, includes a liquid crystal display panel including a pixel region, a backlight unit for irradiating the liquid crystal display panel with light, a plurality of flexible boards for supplying control signals for controlling the liquid crystal display panel, and a printed board on which a driver circuit for driving the liquid crystal display panel is formed. In this case, a plurality of gate drivers and a plurality of source drivers are arranged in the vicinity of the pixel region. The liquid crystal display module is connected to the printed board via the plurality of flexible boards provided for each gate driver.

CITATION LIST

Patent Literature

[PTL 1] JP 2009-229510 A

SUMMARY OF INVENTION

Technical Problem

In the case where, for example, such liquid crystal display module is mounted in a housing, a space for arranging another component or the like sometimes needs to be secured in a width direction of the printed board. Specifically, in the case where, for example, the liquid crystal display module is mounted on a so-called notebook personal computer or laptop personal computer, a space for providing a hinge to fold a portion on which a keyboard is arranged and a portion on which a liquid crystal panel is arranged sometimes needs to be secured on each side of the printed board.

It is therefore an object of the present invention to provide a display device capable of securing, in a width direction of a printed board arranged along a TFT substrate, a space for arranging another component.

Solution to Problem (1) A display device includes a TFT substrate. The TFT substrate includes a display region including a plurality of pixels arranged in matrix, a plurality of source drivers arranged and aligned in a first direction along the display region, and a plurality of gate drivers arranged and aligned in a second direction along the display region. The display device also includes a printed board including a timing controller configured to control the plurality of source drivers and the plurality of gate drivers, and a plurality of flexible boards arranged to extend from an end portion of the TFT substrate toward the printed board and configured to connect the TFT substrate and the printed board to each other. The plurality of flexible boards includes a plurality of first flexible boards that extend obliquely to one side with respect to the second direction, and a plurality of second flexible boards that extend obliquely to another side with respect to the second direction.

(2) In the display device according to Item (1), the plurality of first flexible boards and the plurality of second flexible boards are arranged so as to be symmetric with respect to a center line passing through a center of the printed board along the second direction.

(3) In the display device according to Item (1) or (2), the first flexible boards and the second flexible boards are arranged on both sides of the timing controller, respectively, so as to be away from the timing controller.

(4) In the display device according to Item (1), the first flexible boards are arranged on both sides of the timing controller.

(5) In the display device according to any one of Items (1) to (4), the printed board further includes a connector, and the first flexible boards and the second flexible boards are arranged on both sides of the connector so as to be away from the connector.

(6) In the display device according to Item (5), one of the first flexible boards is arranged between the connector and the timing controller.

(7) In the display device according to any one of Items (1) to (6), the plurality of first flexible boards and the plurality of second flexible boards each have a substantially parallelogram shape.

(8) In the display device according to any one of Items (1) to (7), the plurality of first flexible boards and the plurality of second flexible boards have substantially the same angle with respect to the second direction.

(9) In the display device according to any one of Items (1) to (8), the plurality of flexible boards further include at least one third flexible board that extends along the second direction.

(10) In the display device according to any one of Items (1) to (9), a part of a width of the printed board in a scanning direction is smaller than a width of the TFT substrate.

(11) In the display device according to any one of Items (1) to (10), a shape of each of the plurality of first flexible boards and a shape of each of the plurality of second flexible boards are symmetric to each other.

(12) In the display device according to Item (1), the plurality of flexible boards are connected in the first direction so as to correspond to the plurality of source drivers, respectively.

(13) In the display device according to Item (1), two flexible boards arranged on both ends among the plurality of flexible boards are directed in opposite directions with respect to the second direction.

(14) In the display device according to Item (1), a distance in the first direction between two flexible boards arranged on both ends among the plurality of flexible boards is larger on the TFT substrate side than on the printed board side.

(15) In the display device according to Item (1), two flexible boards arranged on both ends among the plurality of flexible boards are arranged so as to be closer to each other toward the printed board.

(16) In the display device according to Item (1), at least one space between adjacent ones of the plurality of flexible boards becomes narrower toward the printed board.

DESCRIPTION OF EMBODIMENTS

Figure 1:
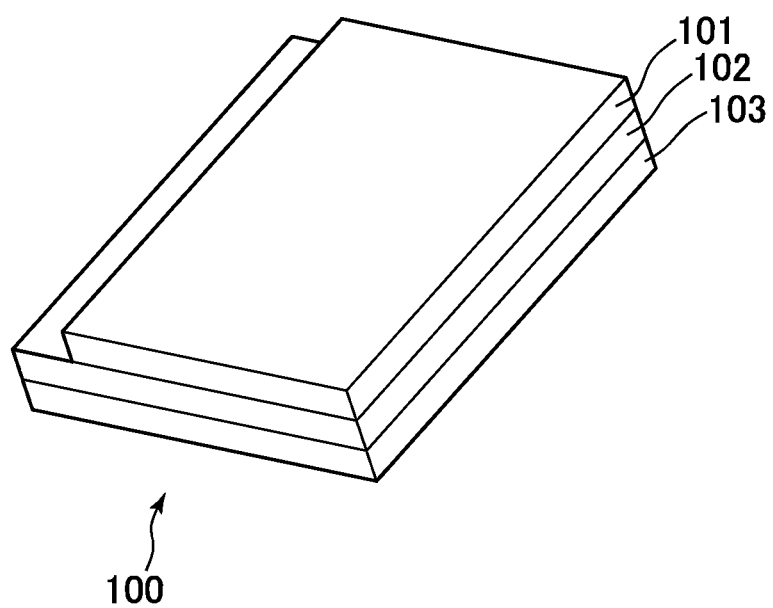
FIG. 1 is a diagram schematically illustrating a display device according to a first embodiment of the present invention.

Referring to the accompanying drawings, embodiments of the present invention are described below. In the drawings, the same or similar components are denoted by the same reference symbols, and repetitive description thereof is omitted.

First Embodiment

FIG. 1 is a diagram schematically illustrating a display device according to a first embodiment of the present invention. As illustrated in FIG. 1, a display device 100 mainly includes a TFT substrate 102 on which thin film transistors (TFTs) and the like (not shown) are formed, and a filter substrate 101 that is opposed to the TFT substrate 102 and provided with a color filter (not shown).

The display device 100 further includes a liquid crystal material (not shown) that is sealed in a region sandwiched by the TFT substrate 102 and the filter substrate 101, and a backlight unit 103 that is located in contact with the side of the TFT substrate 102 opposite to the filter substrate 101 side.

Note that, the display device 100 includes a plurality of flexible boards connected to the TFT substrate 102, a printed board connected to the TFT substrate 102 via the plurality of flexible boards, and the like, which are described later. The outline of the display device illustrated in FIG. 1 is merely an example, and this embodiment is not limited thereto.

Figure 2:
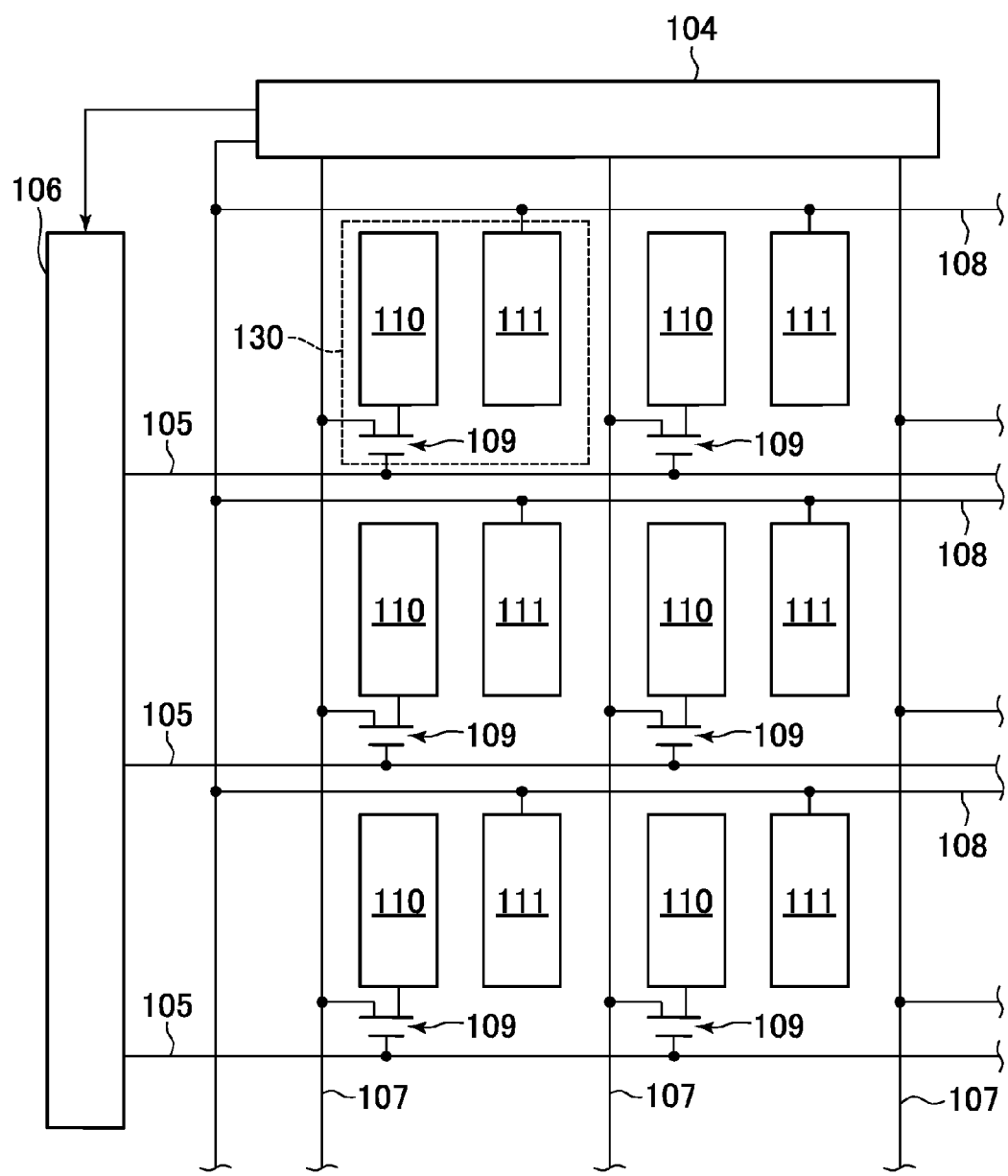
FIG. 2 is a conceptual diagram of a pixel circuit formed on a TFT substrate illustrated in FIG. 1.

FIG. 2 is a conceptual diagram of a pixel circuit formed on the TFT substrate illustrated in FIG. 1. As illustrated in FIG. 2, the TFT substrate 102 includes a plurality of gate signal lines 105 arranged at substantially equal intervals in the horizontal direction of FIG. 2, and a plurality of video signal lines 107 arranged at substantially equal intervals in the vertical direction of FIG. 2. The gate signal lines 105 are connected to a gate driver 106, and the video signal lines 107 are connected to a source driver 104.

The gate driver 106 includes a plurality of basic circuits (not shown) corresponding to the plurality of gate signal lines 105, respectively. Note that, each basic circuit includes a plurality of TFTs and a capacitor, and outputs to a corresponding gate signal line 105 a gate signal that becomes a High voltage in a corresponding gate scanning period (signal High period) in one frame period and becomes a Low voltage in the remaining period (signal Low period).

Pixel regions 130, which are partitioned in matrix by the gate signal lines 105 and the video signal lines 107, each include a TFT 109, a pixel electrode 110, and a common electrode 111. In this case, a gate of the TFT 109 is connected to the gate signal line 105, one of a source and a drain thereof is connected to the video signal line 107, and the other is connected to the pixel electrode 110. The common electrode 111 is connected to a common signal line 108. Note that, the pixel electrode 110 and the common electrode 111 are arranged so as to be opposed to each other. A display region is formed by the pixel regions 130.

Next, the outline of operation of the pixel circuit configured in this manner is described. The source driver 104 applies a reference voltage to the common electrode 111 via the common signal line 108. The gate driver 106, which is controlled by the source driver 104, outputs the gate signal to the gate of the TFT 109 via the gate signal line 105. In addition, the source driver 104 supplies a video signal voltage via the video signal line 107 to the TFT 109 to which the gate signal is output, and the video signal voltage is applied to the pixel electrode 110 via the TFT 109. At this time, a potential difference is generated between the pixel electrode 110 and the common electrode 111.

Then, the source driver 104 controls the potential difference to control the orientation of liquid crystal molecules of the liquid crystal material. In this case, light from the backlight unit 103 is guided into the liquid crystal material, and hence by controlling the orientation of liquid crystal molecules or the like as described above, the amount of light from the backlight unit 103 is adjusted, with the result that an image is displayed. Note that, the configuration of the pixel circuit illustrated in FIG. 2 is merely an example, and it should be understood that another configuration may be employed.

Next, the TFT substrate, the printed board, and the flexible boards of the display device according to this embodiment are mainly described more specifically.

Figure 3:
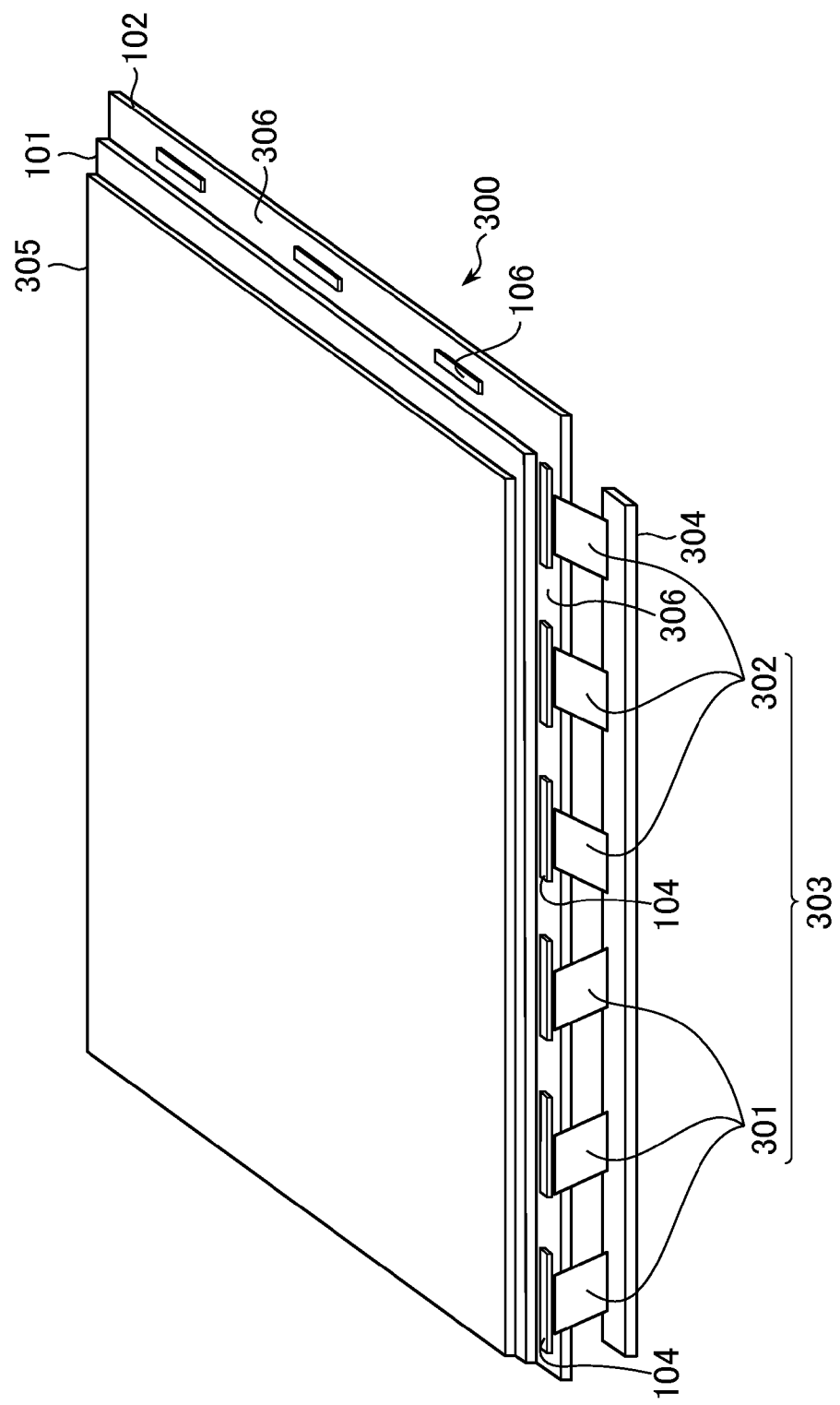
FIG. 3 is a diagram illustrating a display panel according to the first embodiment of the present invention.
Figure 4:
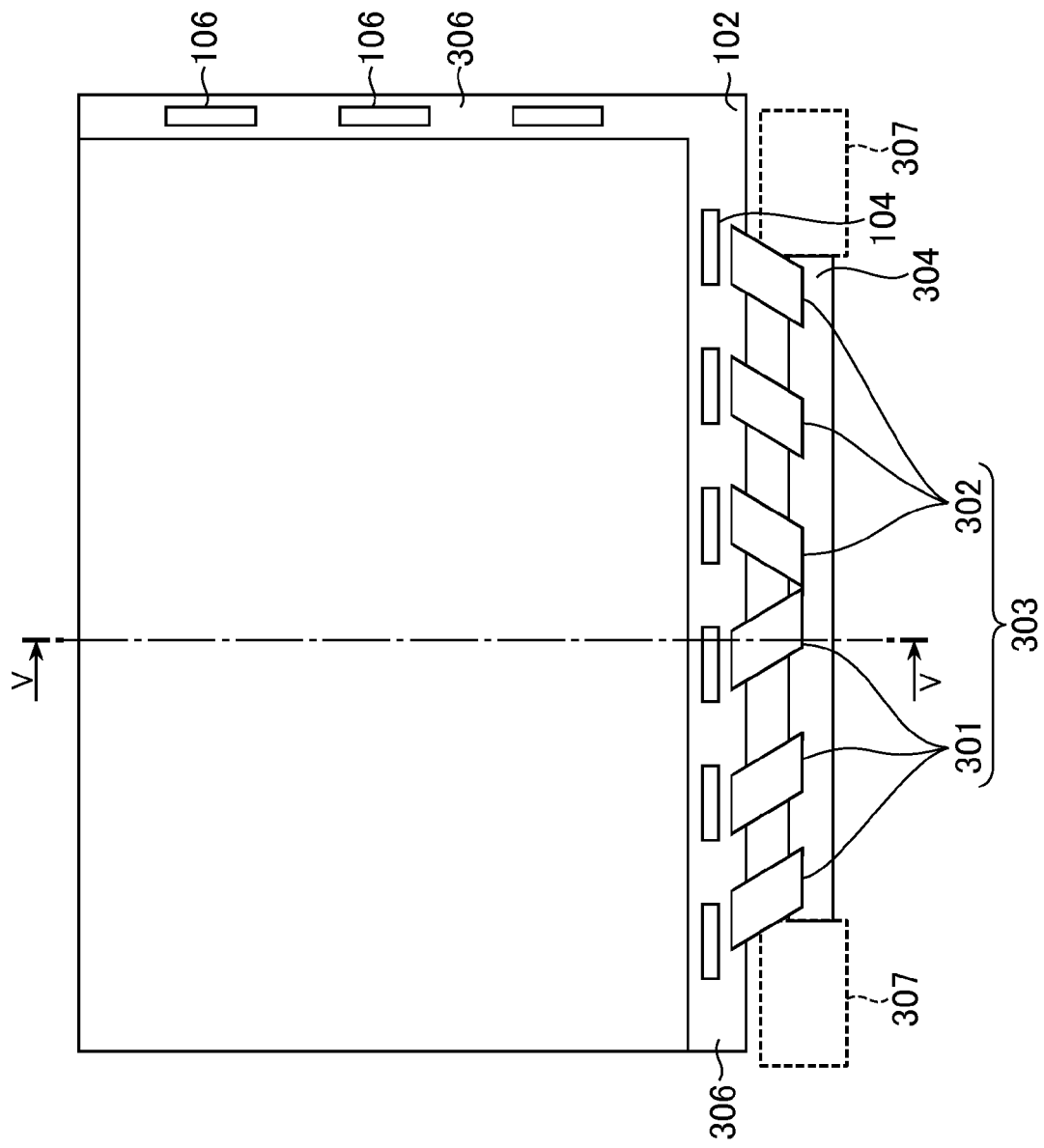
FIG. 4 is a diagram schematically illustrating a top surface of the display panel illustrated in FIG. 3.

FIG. 3 is a diagram illustrating a display panel according to this embodiment. Specifically, FIG. 3 is a perspective diagram schematically illustrating a display panel 300. FIG. 4 is a diagram schematically illustrating a top surface of the display panel 300 illustrated in FIG. 3.

As illustrated in FIG. 3, the display panel 300 mainly includes the TFT substrate 102, the filter substrate 101, a plurality of flexible boards 303, and a printed board 304. In this case, as described above, the TFT substrate 102 is arranged to be opposed to the filter substrate 101, and the liquid crystal material is sealed between the TFT substrate 102 and the filter substrate 101. Note that, the filter substrate 101 includes a color filter (not shown) and a polarizing plate 305, but a detailed description thereof is omitted because the filter substrate 101 is well known.

As illustrated in FIGS. 3 and 4, the longitudinal width of the TFT substrate 102 is larger than the longitudinal width of the filter substrate 101. Specifically, the TFT substrate 102 has a frame region 306 in a direction along the gate signal line 105 (horizontal direction of FIG. 4) and a frame region 306 in a direction along the video signal line (vertical direction of FIG. 4). Note that, in the following, the direction along the gate signal line 105 is referred to as "first direction", and the direction along the video signal line 107 is referred to as "second direction".

In the frame regions 306, the plurality of source drivers 104 are aligned along the first direction, and the plurality of gate drivers 106 are aligned along the second direction. In this case, the plurality of source drivers 104 and the plurality of gate drivers 106 are each formed of an integrated circuit (IC).

Further, the TFT substrate 102 is connected to the printed board 304 via the plurality of flexible boards 303. The plurality of flexible boards 303 are arranged so that each one end thereof is adjacent to each source driver 104, and each other end thereof is connected to the printed board 304. Note that, as described above, the number of the flexible boards 303 corresponds to the number of the source drivers 104 in FIGS. 3, 4, and the like, but those numbers may be different from each other.

As illustrated in FIG. 4, at least a part of the width of the printed board 304 is smaller than the width of the TFT substrate 102 in the first direction. Note that, FIG. 4 illustrates the case where the overall width of the printed board 304 is smaller than the width of the TFT substrate 102, but the printed board 304 may be formed so that a part of the width thereof is smaller than the width of the TFT substrate 102 depending on the shape, size, and the like of a component to be arranged in a space 307 provided in the width direction of the printed board 304. Note that, the space is described in detail later. Although not illustrated in FIG. 4, for example, a timing controller (T-CON IC) for controlling the source driver 104, the gate driver 106, and the like and an I/F connector (connector) for connecting the printed board 304 to another substrate are arranged on the printed board 304.

The plurality of flexible boards 303 include a plurality of first flexible boards 301 that extend obliquely to one side (right side of FIG. 4) with respect to the direction along the second direction (vertical direction of FIG. 4), and a plurality of second flexible boards 302 that extend obliquely to the other side (left side of FIG. 4) with respect to the direction along the second direction.

Specifically, for example, the first flexible board 301 and the second flexible board 302 extend to different sides, the right side and the left side, but have substantially the same shape with substantially the same angle with respect to the second direction. In other words, the shape of the first flexible board 301 and the shape of the second flexible board are symmetric. Accordingly, a force to be applied to the printed board 304 in a manufacturing process or by thermal contraction caused by the backlight unit 103 becomes uniform. Consequently, the occurrence of distortion in the printed board 304 and the flexible boards 303 is suppressed. More specifically, for example, the plurality of flexible boards 303 have a substantially parallelogram shape or a trapezoidal shape. Note that, the first flexible board 301 and the second flexible board 302 may be formed so as to have different angles with respect to the second direction.

In this embodiment, the plurality of first flexible boards 301 are arranged on the left side of a center line of the printed board 304 in the second direction, and the plurality of second flexible boards 302 are arranged on the right side thereof. Specifically, when the first flexible board 301 is represented by A and the second flexible board 302 is represented by B, the plurality of flexible boards 303 are arranged in the order of AAABBB as illustrated in FIG. 4.

As described below, this arrangement reduces the width of the printed board 304 in the first direction to be smaller than the width of the TFT substrate 102, and hence the space 307 for arranging another component is secured on each side of the printed board 304. Note that, FIG. 4 illustrates an example of the space by the dotted rectangular shape 307. In other words, in the case where a flexible board having a rectangular shape (for example, a flexible board 601 to be described later) extending in the second direction from the TFT substrate 102 toward the printed board 304 is used for every flexible board, the width of the printed board 304 needs to be substantially equal to the width of the TFT substrate 102, but according to this embodiment, the width of the printed board 304 becomes smaller than the width of the TFT substrate 102.

Note that, it is desired that the number of the first flexible boards 301 and the number of the second flexible boards 302 be equal to each other. With this, the manufacturing process and the like of the display device 100 becomes simplified. However, among the plurality of flexible boards 303, the number of the first flexible boards 301 and the number of the second flexible boards 302 may be different from each other.

Further, it is desired that the plurality of flexible boards 303 be arranged symmetrically about the center line passing through the center of the printed board 304 along the second direction. Consequently, the stress to be applied to the printed board 304 in the manufacturing process or by thermal contraction caused by the backlight unit becomes uniform. Consequently, the occurrence of distortion in the printed board 304 and the flexible boards is suppressed as well.

In the above, the case where the plurality of flexible boards 303 are arranged in the order of AAABBB has been described as an example. Alternatively, for example, the plurality of flexible boards 303 may be arranged horizontally symmetrically about the center line of the printed board 304 in the order of AABABB, ABBAAB, and ABABAB as well as AAABBB. With the horizontally symmetric arrangement of the plurality of flexible boards 303, the stress to be applied to the printed board 304 in the manufacturing process or by thermal contraction caused by the backlight unit 103 can be made uniform, and, for example, the occurrence of distortion in the printed board 304 is prevented. Note that, in this embodiment, the plurality of flexible boards 303 may be asymmetrically arranged instead of the symmetric arrangement. It should be understood that the first and second flexible boards 301 and 302 need to be arranged at both end portions of the printed board 304 so that the TFT substrate 102 is connected to the printed board 304 that has a smaller width than that of the TFT substrate 102.

Further, the plurality of flexible boards 303 are connected in the first direction so as to correspond to the plurality of source drivers 104, respectively. Two flexible boards arranged on both ends among the plurality of flexible boards 303 are directed in opposite directions with respect to the second direction. A distance in the first direction between the two flexible boards arranged on both ends is larger on the TFT substrate side than on the printed board side. In this case, the distance in the first direction between the two flexible boards arranged on both ends corresponds to a distance between outer ends of the two flexible boards arranged on both ends. Specifically, for example, in the case illustrated in FIG. 4, the distance on the TFT substrate side corresponds to a distance between the outer vertices of the rightmost flexible board 302 of FIG. 4 and the leftmost flexible board 301 of FIG. 4 on the TFT substrate 102 side, and the distance on the printed board side corresponds to a distance between the vertices of the rightmost flexible board 302 of FIG. 4 and the leftmost flexible board 301 of FIG. 4 on the printed board 304 side. In addition, two flexible boards 303 arranged on both ends among the plurality of flexible boards 303 are arranged so as to be closer to each other toward the printed board 304. In addition, at least one space between adjacent ones of the plurality of flexible boards 303 becomes narrower toward the printed board 304. Specifically, for example, in the case illustrated in FIG. 4, a space between the adjacent flexible board 301 and flexible board 302 located at the center becomes gradually narrower in the direction toward the printed board 304.

Figure 5:
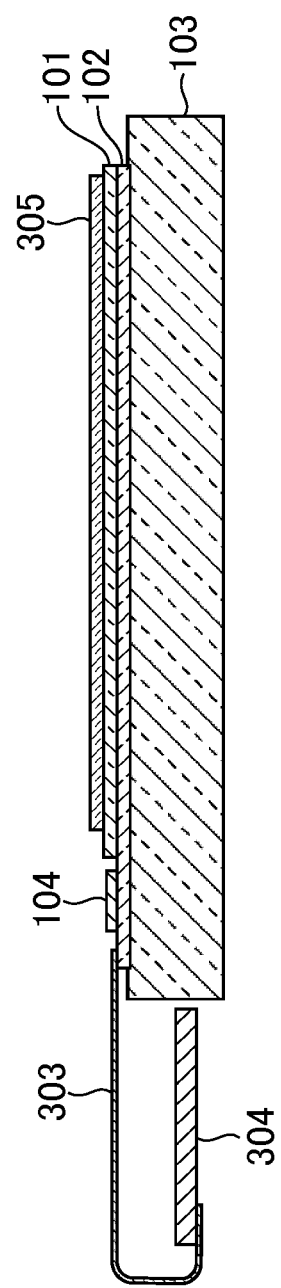
FIG. 5 is a diagram illustrating the arrangement of a printed board when housed in a housing.

FIG. 5 is a diagram illustrating the arrangement of the printed board 304 when housed in a housing. Specifically, FIG. 5 illustrates a schematic cross-section taken along the line V-V of FIG. 4, illustrating an example of how the printed board 304 is housed in the housing.

As illustrated in FIG. 5, the display device 100 includes the backlight unit 103, the filter substrate 101, the TFT substrate 102, the flexible board 303, and the printed board 304. As described above, the polarizing plate 305 is arranged on the front surface of the filter substrate 101. In the frame region 306 of the TFT substrate 102, the source driver 104 is arranged, and one end of the flexible board 303 is arranged so as to be adjacent to the source driver 104.

The flexible boards 303, for example, are extended in the direction along the TFT substrate 102 as illustrated in FIG. 4 and the like, and then folded in the thickness direction of the display device 100 and toward the backlight unit 103 illustrated in FIG. 5 so that the printed board 304 is arranged in the direction along the surface of the backlight unit 103. Consequently, the printed board 304 is arranged so as to be adjacent to the backlight unit 103.

The present invention is not intended to be limited to the above-mentioned embodiment, and may be replaced with substantially the same configuration as those illustrated in the above-mentioned embodiment, a configuration that provides the same functions and effects, or a configuration that achieves the same object.

For example, the case where the plurality of flexible boards 303 are constructed by two types of the first flexible board 301 and the second flexible board 302 has been described above, but as illustrated in FIG. 6, the plurality of flexible boards 303 may further include third flexible boards 601 each having a substantially rectangular shape extending from the TFT substrate 102 to the printed board 304 along the second direction.

Figure 6:
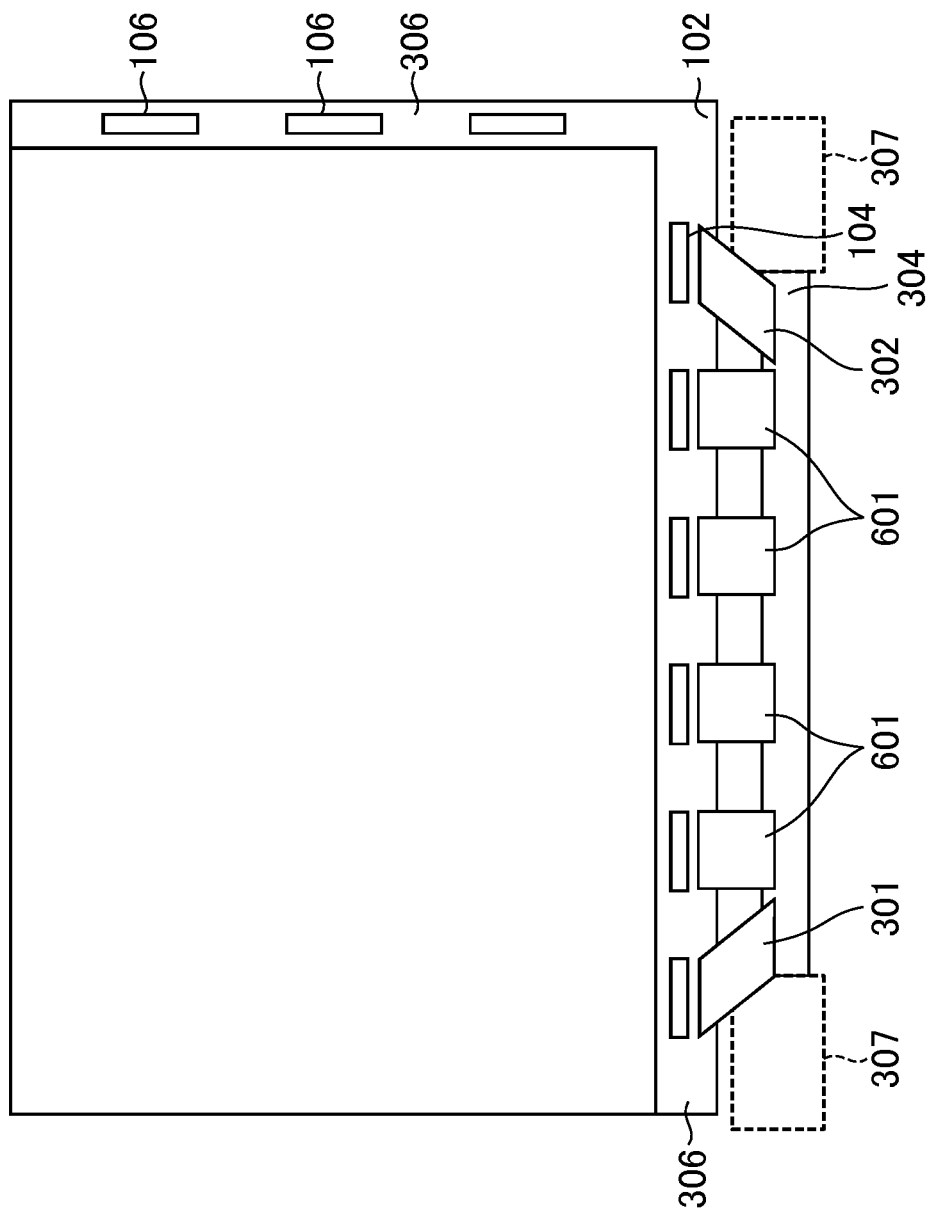
FIG. 6 is a diagram illustrating a modified example of the first embodiment of the present invention.

In this case, for example, by arranging the first and second flexible boards 301 and 302 at both ends of the printed board 304, the spaces 307 are secured in the width direction of the printed board 304 similarly to the above. However, in terms of reducing the number of components and simplifying the manufacturing process, it is desired to use the two kinds of flexible boards 303 as described above. Note that, FIG. 6 illustrates the case where the first and second flexible boards 301 and 302 are arranged only on both sides of the printed board 304, but the first and second flexible boards 301 and 302 may be used also as the flexible boards that are arranged at other portions (portions excluding both sides).

Further, the case where the spaces 307 are secured on both sides of the printed board 304 has been described above, but this embodiment is also applicable to the case where the space 307 needs to be secured only on one side of the printed board 304. In this case, for example, the width of the printed board 304 may be reduced in accordance with the space 307, and the first or second flexible board 301 or 302 may be used as the flexible board 303 adjacent to the space 307.

In addition, in the above description, the sixth source drivers 104, the three gate drivers 106, and the plurality of six flexible boards 303 are used for the sake of simple description, but other numbers of the source drivers 104 and the like may be used depending on the size and the like of the display panel 300.

Second Embodiment

Next, a second embodiment of the present invention is described. This embodiment differs from the illustrated configuration of the first embodiment mainly in that the first flexible board 301 and the second flexible board 302 are arranged on both sides of a timing controller 701 (T-CON IC) so as to be separated away from the timing controller 701. Note that, a description of the same parts as those in the first embodiment is omitted below.

Figure 7:
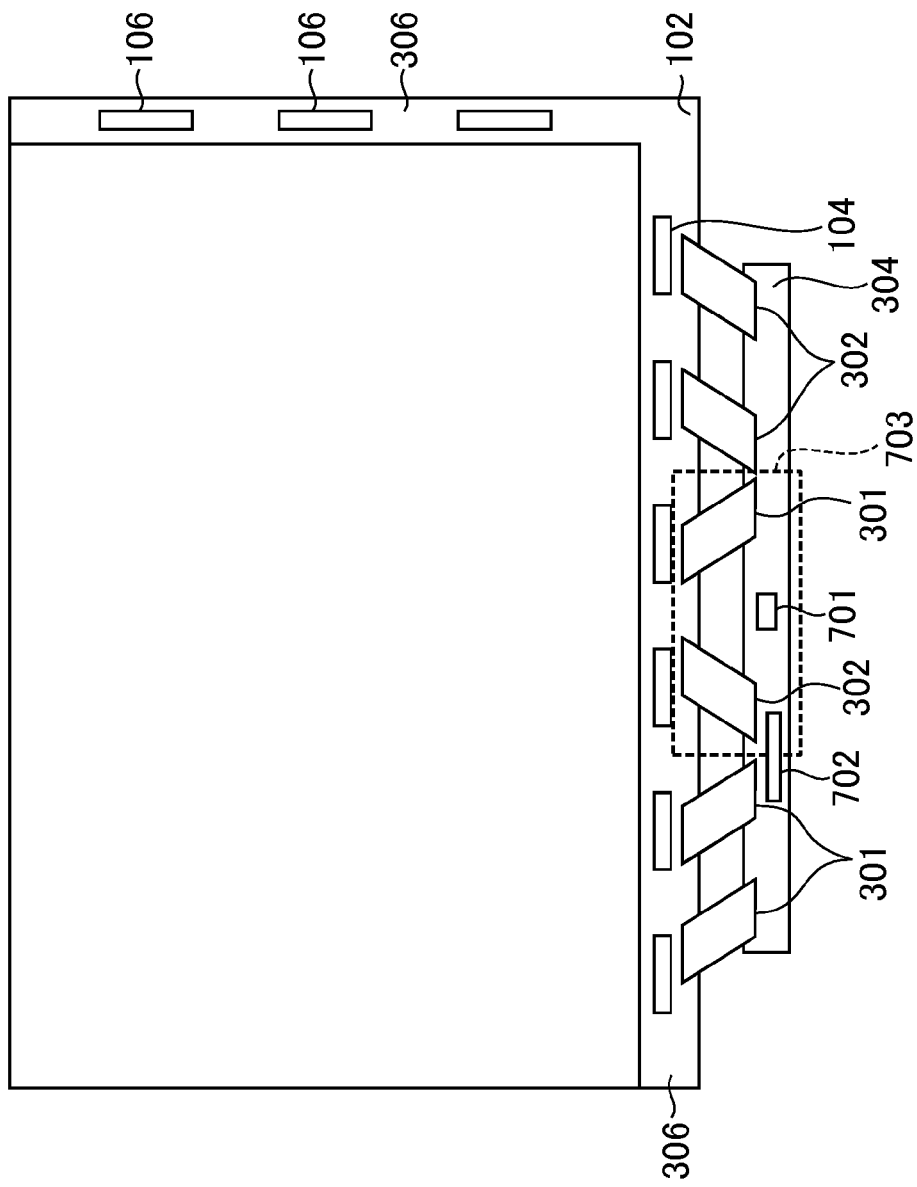
FIG. 7 is a diagram illustrating a second embodiment of the present invention.

FIG. 7 is a diagram illustrating the second embodiment of the present invention. Note that, FIG. 7 corresponds to FIG. 4 and schematically illustrates a top surface of the display panel 300 according to this embodiment.

As illustrated in FIG. 7, the timing controller 701 is arranged at substantially the center of the printed board 304. Further, a connector 702 (I/F connector) is arranged at a predetermined position of the printed board 304. Note that, the position of the connector 702 is defined under the standards, for example.

In this case, in this embodiment, the first flexible board 301 and the second flexible board 302 are arranged on both sides of the timing controller 701 so as to be away from the timing controller 701 as illustrated in FIG. 7. Specifically, for example, a plurality of flexible boards 303 are arranged in the order of AABABB from the left side of FIG. 7. Note that, A and B correspond to the first flexible board 301 and the second flexible board 302, respectively, as described above.

In this case, for example, if the plurality of flexible boards 303 are arranged in the order of AAABBB in the first embodiment, a space at the center portion of the printed board 304 is small as understood from FIG. 4. In this embodiment, however, as described above, the first flexible board 301 and the second flexible board 302 are arranged on both sides of the timing controller 701 so as to be away from the timing controller 701 as illustrated in FIG. 7. Accordingly, this embodiment secures the spaces 307 on both sides of the printed board 304 similarly to the first embodiment and also secures a sufficient space 703 for arranging the timing controller 701. Thus, the printed board 304 is further downsized, with the result that the overall display device 100 is downsized.

The present invention is not intended to be limited to the above-mentioned embodiment, and may be replaced with substantially the same configuration as that illustrated in the above-mentioned embodiment, a configuration that provides the same functions and effects, or a configuration that achieves the same object.

For example, the plurality of flexible boards 303 are arranged in the order of AABABB from the left of FIG. 7 as an example in the above, but may be arranged in another order, such as ABBAAB, as long as the first flexible board 301 and the second flexible board 302 are arranged on both sides of the timing controller 701 so as to be separated away from the timing controller 701. Note that, similarly to the first embodiment, it is desired that the plurality of flexible boards 303 be arranged symmetrically about the center line of the printed board 304 and that the numbers of the first and second flexible boards 301 and 302 be equal to each other.

Third Embodiment

Next, a third embodiment of the present invention is described. This embodiment differs from the configurations illustrated in the first and second embodiments in that the first flexible board 301 and the second flexible board 302 are arranged on both sides of a connector 702 so as to be away from the connector 702. Note that, a description of the same parts as those in the first and second embodiments is omitted below.

Figure 8:
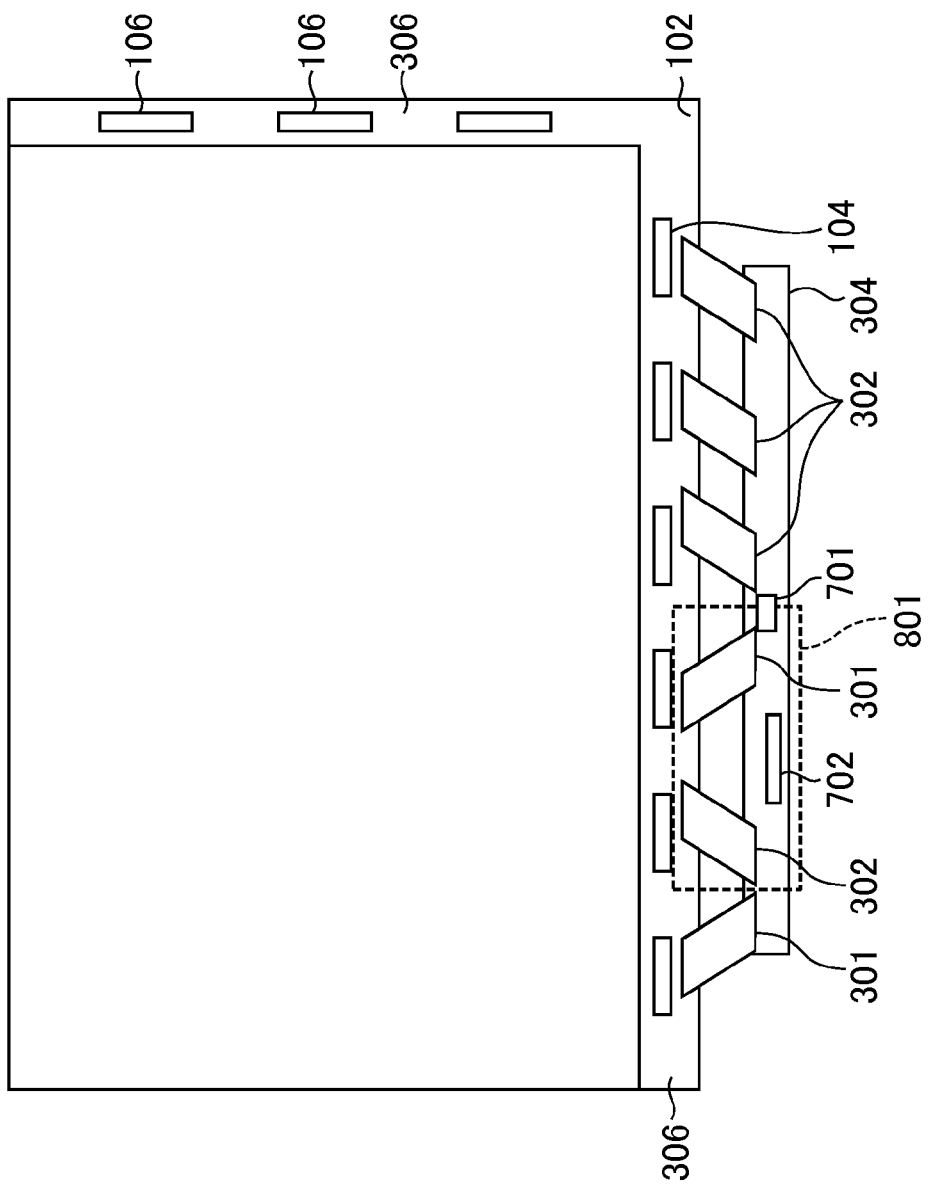
FIG. 8 is a diagram illustrating a third embodiment of the present invention.

FIG. 8 is a diagram illustrating the third embodiment of the present invention. Note that, FIG. 8 corresponds to FIG. 4 and schematically illustrates a top surface of the display panel 300 according to this embodiment.

As illustrated in FIG. 8, the connector 702 is arranged at a predetermined position of the printed board 304. Note that, the predetermined position of the connector 702 is defined by the standards, for example. In this case, the first flexible board 301 and the second flexible board 302 are arranged on both sides of the connector 702 so as to be separated away from the connector 702. In other words, as illustrated in FIG. 8, the first flexible board 301 is arranged on the right side of the connector 702, and the second flexible board 302 is arranged on the left side of the connector 702. Specifically, as illustrated in FIG. 8, the first flexible boards 301 and the second flexible boards 302 are arranged in the order of, for example, ABABBB from the left side of the printed board 304.

This embodiment secures a sufficient space 801 for arranging the connector 702. Consequently, the spaces 307 are secured on both sides of the printed board 304 similarly to the first and second embodiments, and further the printed board 304 is downsized, so that the overall display device 100 is downsized.

The present invention is not intended to be limited to the above-mentioned embodiment, and may be replaced with substantially the same configuration as that illustrated in the above-mentioned embodiment, a configuration that provides the same functions and effects, or a configuration that achieves the same object.

For example, the case where the plurality of flexible boards 303 are arranged in the order of ABABBB from the left side of the printed board 304 has been described as an example in the above, but similarly to the second embodiment, the plurality of flexible boards 303 may be arranged in another order, such as ABABAB, as long as the first flexible board 301 and the second flexible board 302 are arranged on both sides of the connector 702 so as to be away from the connector 702. Note that, as described above, it is desired that the plurality of flexible boards 303 be arranged symmetrically about the center line of the printed board 304 and that the numbers of the first and second flexible boards 301 and 302 be equal to each other.

Fourth Embodiment

Next, a fourth embodiment of the present invention is described. This embodiment differs from the configurations illustrated in the first to third embodiments mainly in that the first flexible board 301 and the second flexible board 302 are arranged on both sides of the connector 702 so as to be separated away from the connector 702, and the first flexible boards 301 are arranged on both sides of the timing controller 701. Note that, a description of the same parts as those in the first to third embodiments is omitted below.

Figure 9:
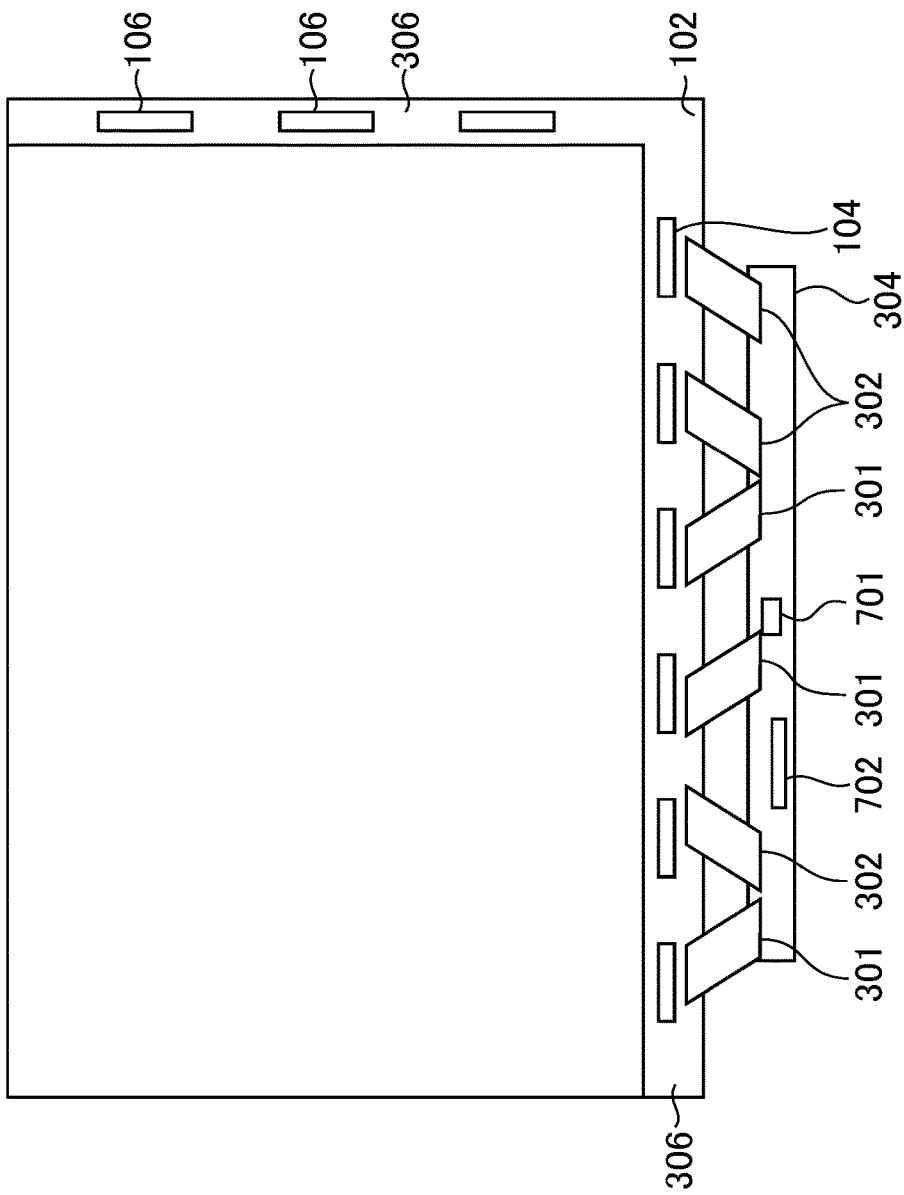
FIG. 9 is a diagram illustrating a fourth embodiment of the present invention.

FIG. 9 is a diagram illustrating the fourth embodiment of the present invention. Note that, FIG. 9 corresponds to FIG. 4 and schematically illustrates a top surface of the display panel 300 according to this embodiment.

As illustrated in FIG. 9, similarly to the third embodiment described above, the connector 702 is arranged at a predetermined position of the printed board 304. In this case, the first flexible board 301 and the second flexible board 302 are arranged on both sides of the connector 702 so as to be away from the connector 702. In other words, as illustrated in FIG. 9, the first flexible board 301 is arranged on the right side of the connector 702, and the second flexible board 302 is arranged on the left side of the connector 702. Further, the first flexible boards 301 are arranged on both sides of the timing controller 701.

In other words, as illustrated in FIG. 9, the flexible board 301 is arranged between the connector 702 and the timing controller 701 so as to be further away from the connector 702 and be closer to the timing controller 701. In this case, as illustrated in FIG. 9, the space 703 required for the timing controller 701 is larger than the space 801 required for the connector 702.

As described above, in this embodiment, the plurality of flexible boards 303 are arranged in the order of, for example, ABAABB from the left side of the printed board 304 illustrated in FIG. 9. Then, the connector 702 is arranged between the second leftmost second flexible board 302 and the third leftmost first flexible board 301, and the timing controller 701 is arranged between the third leftmost first flexible board 301 and the fourth leftmost first flexible board 301.

This embodiment secures the spaces 307 on both sides of the printed board 304 similarly to the first to third embodiments, and secures the space 801 for arranging the connector 702 and the space 703 for arranging the timing controller 701. Consequently, the printed board 304 is downsized as compared to the first to third embodiments, with the result that the overall display device 100 is downsized.

Note that, for example, as illustrated in FIG. 9, it is desired that the number of the first flexible boards 301 and the number of the second flexible boards 302 be equal to each other. Consequently, the simplification of the manufacturing process and the like is achieved.

In addition, by arranging the plurality of flexible boards 303 in the order of ABAABB as described above, the stress to be applied to the printed board 304 in the manufacturing process or by thermal contraction caused by the backlight unit becomes uniform. Consequently, the occurrence of distortion in the plurality of flexible boards 303 and the printed board 304 is suppressed.

The present invention is not intended to be limited to the above-mentioned embodiment, and may be replaced with substantially the same configuration as that illustrated in the above-mentioned embodiment, a configuration that provides the same functions and effects, or a configuration that achieves the same object.

For example, the plurality of flexible boards 303 are arranged in the order of ABAABB from the left side of FIG. 9 in the above description, but may be arranged in another order, mainly as long as the first flexible board 301 and the second flexible board 302 are arranged on both sides of the connector 702 so as to be separated away from the connector 702, and the first flexible boards 301 are arranged on both sides of the timing controller 701. For example, the connector 702 may be arranged on the opposite side of the center line of the printed board, and the plurality of flexible boards 303 may be arranged in the order of AABBAB. Note that, in this case, it is desired that the numbers of the first and second flexible boards 301 and 302 be equal to each other similarly to the above.

The invention claimed is:

1. A display device, comprising:
   a TFT substrate comprising:
      a display region including a plurality of pixels arranged in matrix;

a plurality of source drivers arranged and aligned in a first direction along the display region; and a plurality of gate drivers arranged and aligned in a second direction along the display region;

a printed board including a timing controller configured to control the plurality of source drivers and the plurality of gate drivers; and a plurality of flexible boards arranged to extend from an end portion of the TFT substrate toward the printed board and configured to connect the TFT substrate and the printed board to each other, wherein the plurality of flexible boards comprise at least one first flexible board that extends obliquely to one side with respect to the second direction, and at least one second flexible board that extends obliquely to another side with respect to the second direction, wherein at least of one the first flexible board and the second flexible board has a first side line and a second side line opposed to the first side line extending from the TFT substrate toward the printed board, and wherein both of the first side line and the second side line extend obliquely in a same direction with respect to the second direction.

2. The display device according to claim 1, wherein the first flexible board and the second flexible board are arranged so as to be symmetric with respect to a center line passing through a center of the printed board along the second direction.

3. The display device according to claim 1, wherein the first flexible board and the second flexible board are arranged on both sides of the timing controller, respectively, so as to be away from the timing controller.

4. The display device according to claim 1, further comprising a second first flexible board, wherein the timing controller is disposed between the first flexible board and the second first flexible board.

5. The display device according to claim 1, wherein the printed board further comprises a connector, and wherein the first flexible board and the second flexible board are arranged on both sides of the connector so as to be away from the connector.

6. The display device according to claim 5, wherein the first flexible board is arranged between the connector and the timing controller.

7. The display device according to claim 1, wherein the first flexible board and the second flexible board each have a substantially parallelogram shape.

8. The display device according to claim 1, wherein the first flexible board and the second flexible board have substantially the same angle with respect to the second direction.

9. The display device according to claim 1, wherein the plurality of flexible boards further comprise at least one third flexible board that extends along the second direction.

10. The display device according to claim 1, wherein a part of a width of the printed board in the second direction is smaller than a width of the TFT substrate.

11. The display device according to claim 1, wherein a shape of the first flexible board and a shape of the second flexible board are symmetric to each other.

12. The display device according to claim 1, wherein the plurality of flexible boards are connected in the first direction so as to correspond to the plurality of source drivers, respectively.

13. The display device according to claim 1, wherein two flexible boards arranged on both ends among the plurality of flexible boards are directed in opposite directions with respect to the second direction.

14. The display device according to claim 1, wherein a distance in the first direction between two flexible boards arranged on both ends among the plurality of flexible boards is larger on the TFT substrate side than on the printed board side.

15. The display device according to claim 1, wherein two flexible boards arranged on both ends among the plurality of flexible boards are arranged so as to be closer to each other toward the printed board.

16. The display device according to claim 1, wherein at least one space between adjacent ones of the plurality of flexible boards becomes narrower toward the printed board.

* * * * *